Nov. 30, 1948.  C. P. CRAWFORD  2,454,993
COOKING UNIT

Filed April 13, 1945  2 Sheets-Sheet 1

Inventor:
Charles P. Crawford
By: Wm. F. Freudenreich,
Attorney.

Nov. 30, 1948.   C. P. CRAWFORD   2,454,993
COOKING UNIT
Filed April 13, 1945   2 Sheets-Sheet 2

Inventor:
Charles P. Crawford
By: Wm. F. Freudenreich,
Attorney

Patented Nov. 30, 1948

2,454,993

UNITED STATES PATENT OFFICE 2,454,993

COOKING UNIT

Charles P. Crawford, Chicago, Ill.

Application April 13, 1945, Serial No. 588,161

5 Claims. (Cl. 219—35)

The ordinary household electric cooking devices are usually designed for the purpose of cooking in one particular way only; as, for example, to toast bread, to bake waffles or to serve simply as a hot plate or grid. The present invention has for its object to produce a simple, novel, compact and light unit by means of which quite a variety of different methods of cooking can be carried out satisfactorily.

Viewing my invention as a toaster it may be said to have for its object the production of toasted bread and cheese sandwiches or the like of a quality superior to similar toasted foods made according to old methods and with toasters of the ordinary types.

In the simplest form of my invention I employ an oven that is a box or shell open at the top and bottom ends, and containing a horizontal grating which extends across the length and width thereof. An electric heating element is supported just below the grating. Plates, that are preferably in the form of shallow trays, are employed to close the oven at top or bottom, or both, when desired. Such plates serve not only as closures but, also as reflectors; the upper plate tending to reflect the heat that rises from the heating unit down into the bottom of the oven, while the lower plate tends to reflect the heat up. In its more highly developed form, the oven is provided with a second, movable, grating with which one of the plates or trays may at times cooperate.

Figure 1:
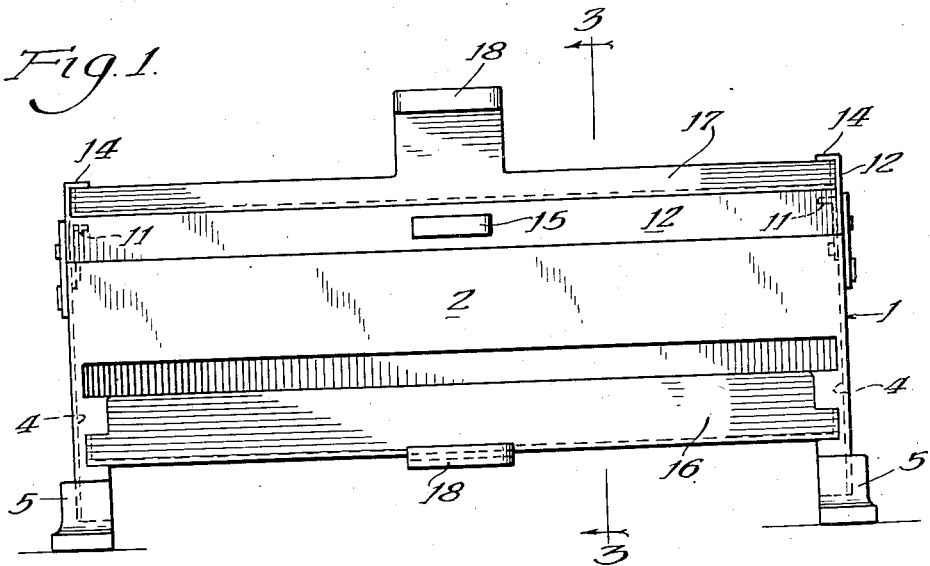
Figure 2:
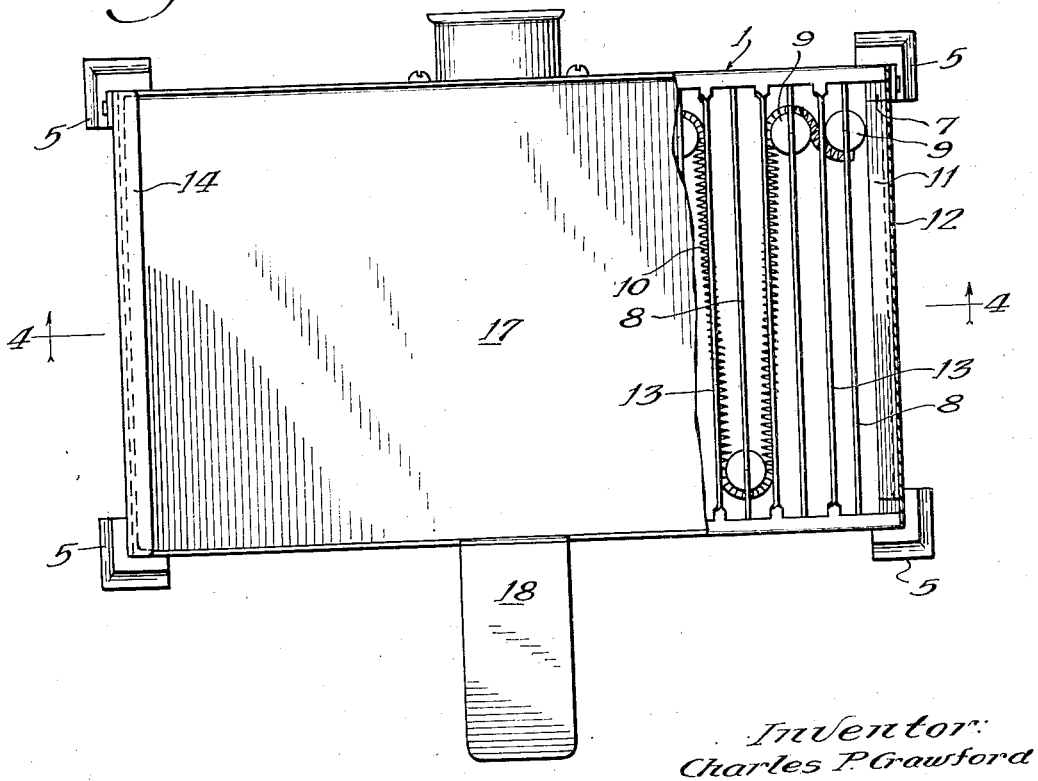
Figure 3:
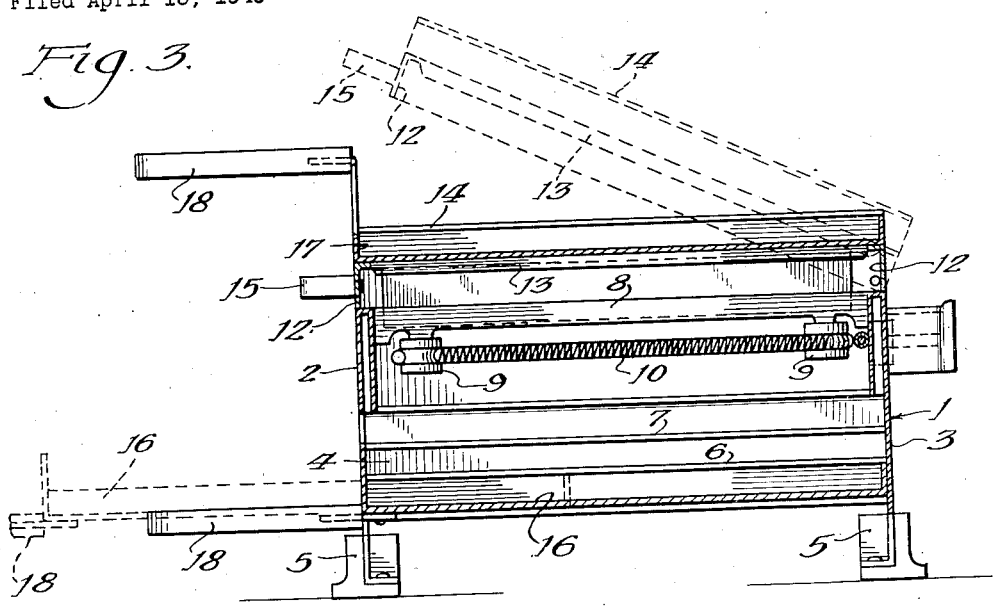
Figure 4:
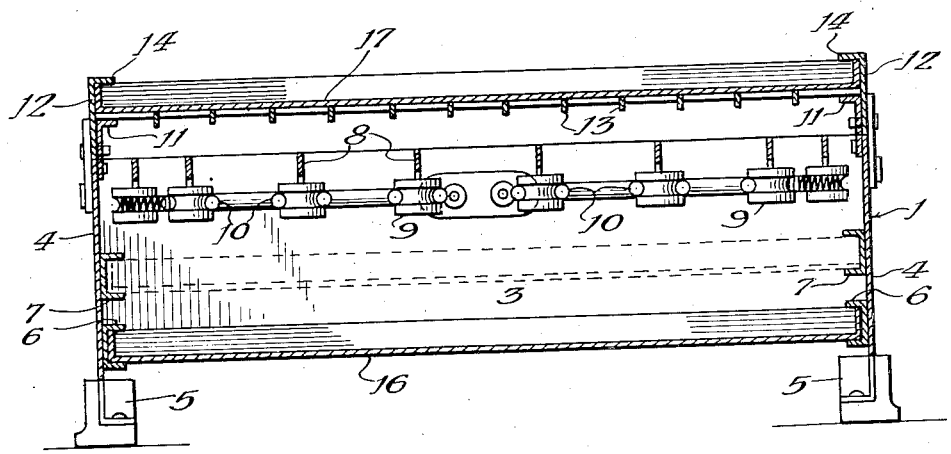

The various features of novelty whereby my invention is characterized will hereinafter be pointed out with particularity in the claims; but, for a full understanding of the invention and its various objects and advantages, reference may be had to the following detailed description taken in connection with the accompanying drawings, wherein:

Figure 1 is a front view of a cooking unit embodying the present invention in a preferred form; Fig. 2 is a top plan view of the unit, portions of the top being broken away; Fig. 3 is a section on line 3—3 of Fig. 1; and Fig. 4 is a section on line 4—4 of Fig. 2.

Referring to the drawings, 1 represents a metal box or shell, open at top and bottom and preferably rectangular in cross section; the material from which it is made being conveniently sheet metal. This member constitutes the body portion of a small oven. The front wall of the oven, 2, is of less height than the rear and side walls, 3 and 4, respectively; the latter walls projecting a considerable distance below the lower edge of the front wall. Feet 5 are placed at the four corners of the oven to hold it well above any surface on which the oven may be supported. On the inner faces of those portions of the side walls 4 below the level of the lower edge of the front wall are parallel guides extending from front to rear; two pairs of such guides, in the form of channels 6 and 7, one below the other, being shown. In the very top of the box or oven is a grating consisting of flat, parallel bars 8, set on edge and extending from the front wall to the rear wall; the bars being distributed across the entire width of the box. Mounted on the under side of the bars are spools 9 of refractory material around which is passed a heating element consisting of a helically coiled wire 10. It will be noted that the grate bars 8 are so placed that their upper edges are flush with the upper edges of the vertical walls of the box or oven. Fastened to the inner sides of the side walls 4 are two metal strips or narrow plates 11 that rise above the tops of the grating and are flanged inwardly. These strips not only constitute guides and holders, as will hereinafter appear, but they stiffen the upper marginal portions of the side walls of the oven so as to reduce the danger of warping under the heat to which the oven walls are subjected in use.

Hinged to the upper part of the oven, near but not quite at the rear end, is a frame 12 of the same length and breadth as the oven and composed of a strip of metal of the same kind as in the walls of the box, set on edge. The upwardly projecting parts 11 on the side walls of the box lie on the inside of the frame when the latter is down as indicated in full lines in the drawings. When down, the frame, in effect, constitutes a continuation of the four vertical walls of the box or oven. When it is swung up, the rear member of the frame rests on top of the rear wall of the oven and stands upright and out of the way. The frame 12 is provided with a grating composed of narrow bars extending from front to rear in a plane about midway between the upper and lower edges of the members of the frame. The front member of the frame is cut away above the grating 13, while the side members are flanged inwardly along their upper edges as indicated at 14. A finger piece 15 composed of a material that is a poor conductor of heat is fixed to the front member of the frame for swinging the frame up out of the way when desired.

Cooperating with the oven structure heretofore described are two slides or plates 16 and 17 that are preferably flanged at their edges to give them the characteristics of shallow trays. The tray 16 is adapted to be inserted between either the lower guides 6 or the upper guides 7 to provide the oven with a solid bottom wall. The tray 17 may be slid into position on grating 13 from the front, being guided by the side members of the frame and being held down by the flanges 14. Thus the tray 17 acts as a solid top wall for the oven when placed as just described. Also, if the frame has been swung up out of the way, tray 17 may be slid into position on the lower grating 8, being guided and held down by the flanged strips 11; thus again forming a top wall for the oven. Furthermore, the two trays are interchangeable, each being adapted to occupy any position that the other may at other times occupy. Each tray has at the front end a long handle 18 of a material that is a poor conductor of heat, so that the trays can readily be handled while the oven is hot.

My improved cooking unit may be used in many different ways. For example, cooking utensils may be placed on either grating or on a tray resting on either grating, or some kinds of food may be placed directly on one or the other of the gratings; the intensity of the heat to which the food is subjected being less when it is farther away from the heating element than when it is close to the latter. With a tray interposed between the food or the food receptacle and the heating element, the heating effect is less than it would be if no tray were used. On the other hand, the heating effect may be intensified by closing the bottom of the oven with one of the trays. Food in a tray below the heating element will be subjected to greater heat when the tray is positioned between the guides of the upper pair than when it is in the lower of its two positions. In this situation, also, the heating effect will be intensified if the top of the oven is closed by means of a tray to reflect heat downward into the bottom of the oven.

Without attempting to explain all of the possible uses of the unit, it may be said that the food may be caused to simmer, boil, toast or fry on top of the oven or be toasted, baked or broiled in the bottom of the oven. By making the unit quite wide, two kinds of food may be cooked side by side. For example, eggs and bacon may be fried in opposite ends of the same tray which, if desired, may contain a partition.

So far as toasting bread or cheese sandwiches is concerned, the present invention lends itself to radically new practices that result in a greatly improved product. I have found that a piece of bread need not be toasted on both sides if it is buttered and toasted on the buttered side. Such a buttered piece need only be placed in a tray below the heating element to cause the butter to be toasted along with and be driven deeply into the bread. In the same way, cheese may be spread on a piece of bread and toasting be done from one side only. Of course, bread may be toasted on both sides and, in making a cheese sandwich, the bread may be toasted on one or both sides before the spreading of the cheese thereon and the toasting of the cheese.

While I have illustrated and described with particularity only a preferred form of my invention, I do not desire to be limited to the exact details thus illustrated and described; but intend to cover all forms and arrangements that come within the definitions of my invention constituting the appended claims.

I claim:

1. A cooking unit comprising an oven open at the top, a transverse grating in the oven, a heating element supported below the grating, a second grating hinged to the top of the oven so as to be capable of swinging from a position somewhat above and parallel to the other grating to an idle position at one side of the oven, a tray of a size and shape to allow it to be positioned between the two gratings, and elements on the upper grating to hold the tray in position when placed thereon.

2. A cooking unit comprising an oven open at the top and bottom, a transverse grating in the oven, a heating element supported below and near the said grating, a second grating hinged to the top of the oven so as to be capable of swinging from a position above and parallel to the other grating to an idle position at one side of the oven, a plate of a size and shape to allow it to be positioned on either of the two gratings to close the top of the oven, and elements on each grating to hold the plate in position when it is placed on that grating.

3. A cooking unit as set forth in claim 2, wherein the plate is in the form of a tray.

4. A cooking unit comprising an oven open at the top and bottom, a transverse grating in the oven, a heating element supported below and near the said grating, a second grating hinged to the top of the oven so as to be capable of swinging from a position somewhat above and parallel to the other grating to an idle position at one side of the oven, a plate of a size and shape to allow it to be positioned on either of the two gratings to close the top of the oven, elements on the upper grating to hold the plate in position when placed on that grating, and means to support the plate in position to close the bottom of the oven.

5. A cooking unit comprising an oven open at the top and at the bottom, a horizontal grating within the oven, a heating element supported below and near said grating, a second grating movably connected to the oven so as to be shiftable from a position somewhat above and parallel to the first grating to an idle position at one side of the oven, a tray of a size and shape to allow it to be positioned on either of the gratings to close the top of the oven, elements on each grating to cooperate with the tray to hold it in place on that grating after being placed there, a tray forming a detachable bottom for the oven, and means to support the latter tray at any one of a plurality of elevations relative to the oven.

CHARLES P. CRAWFORD.

REFERENCES CITED

The following references are of record in the file of this patent:

UNITED STATES PATENTS

| Number | Name | Date |
|---|---|---|
| 1,421,959 | Kloeffler | July 4, 1922 |
| 1,751,219 | Seamon | Mar. 18, 1930 |
| 1,849,595 | Shaw | Mar. 15, 1932 |
| 1,959,198 | Conry | May 15, 1934 |
| 2,174,079 | Dadson | Sept. 26, 1939 |
| 2,386,426 | Brannon | Oct. 9, 1945 |